United States Patent [19]

Gaynor et al.

[11] Patent Number: 4,799,896
[45] Date of Patent: Jan. 24, 1989

[54] SOCKET FOR COMPACT FLUORESCENT LAMPS

[75] Inventors: Edwin Gaynor, Southport; John C. Dinsdale, Stratford, both of Conn.

[73] Assignee: Edwin Gaynor Co., Stratford, Conn.

[21] Appl. No.: 112,527

[22] Filed: Oct. 26, 1987

[51] Int. Cl.$^4$ .............................................. H01R 33/02
[52] U.S. Cl. .................................... 439/232; 439/242; 439/350
[58] Field of Search ................................. 439/226–228, 439/230, 231, 232–237, 242–244, 350, 351, 353, 354, 356, 357, 358, 438, 439, 441, 375

[56] References Cited

U.S. PATENT DOCUMENTS

| | | | |
|---|---|---|---|
| 3,206,710 | 9/1965 | McLaughlin | 439/441 |
| 3,241,094 | 3/1966 | Harton | 439/356 |
| 3,418,622 | 12/1968 | McLaughlin | 439/234 |
| 4,596,433 | 6/1986 | Oesterheld et al. | 439/206 |
| 4,637,671 | 1/1987 | Johnson et al. | 339/50 R |
| 4,643,503 | 2/1987 | Johnson et al. | 339/50 R |
| 4,713,019 | 12/1987 | Gaynor | 439/232 |
| 4,723,200 | 2/1988 | Troen | 439/232 |

*Primary Examiner*—David Pirlot
*Attorney, Agent, or Firm*—Mattern, Ware, Stoltz & Fressola

[57] ABSTRACT

A socket for a compact fluorescent lamp which includes two or more parallel tubes that share a common base, said base including at least two terminal pins and retaining means for engagement with the socket, has a housing including a back wall, a front wall, with top and bottom walls and two side walls extending from said back wall and forward of said front wall, thereby defining a front opening for receiving said lamp base. Channels are formed in said housing enclosing conductive terminals for receiving each of said terminal pins in electrically conductive engagement. Said front wall defines openings through which the terminal pins project for engagement with said conductive terminals. An inward facing nonresilient hook is formed on the forward edge of one of said top and bottom walls for engagement with said retaining means of the lamp base, and an inward facing resilient hook is formed on the forward edge of the other of said top and bottom walls for establishing reversible locking engagement with said retaining means of said lamp base. When said lamp base is inserted in said socket, the combination of the grasping engagement of said inward facing hooks and said retaining means and the grasping engagement of said terminal pins and said conductive terminals is sufficient that said socket and said lamp can be mounted in any orientation without the need for additional support apart from said socket itself. All electrically active parts are inaccessible and totally protected against accidental contact with external objects.

14 Claims, 7 Drawing Sheets

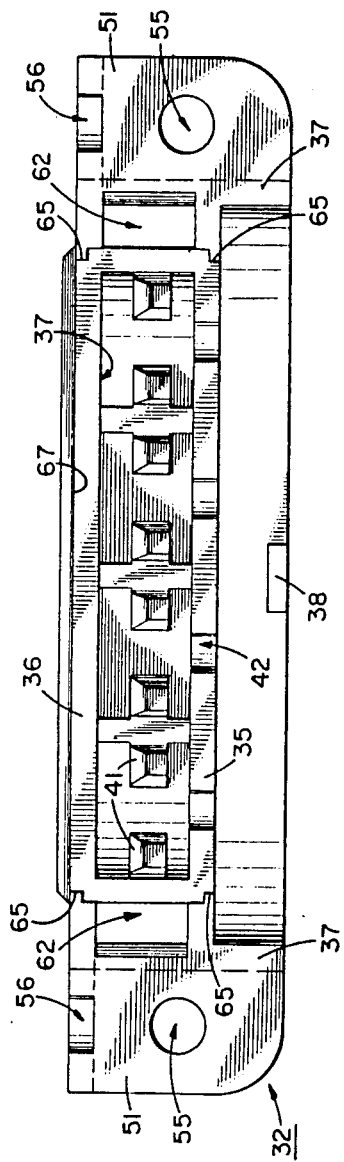
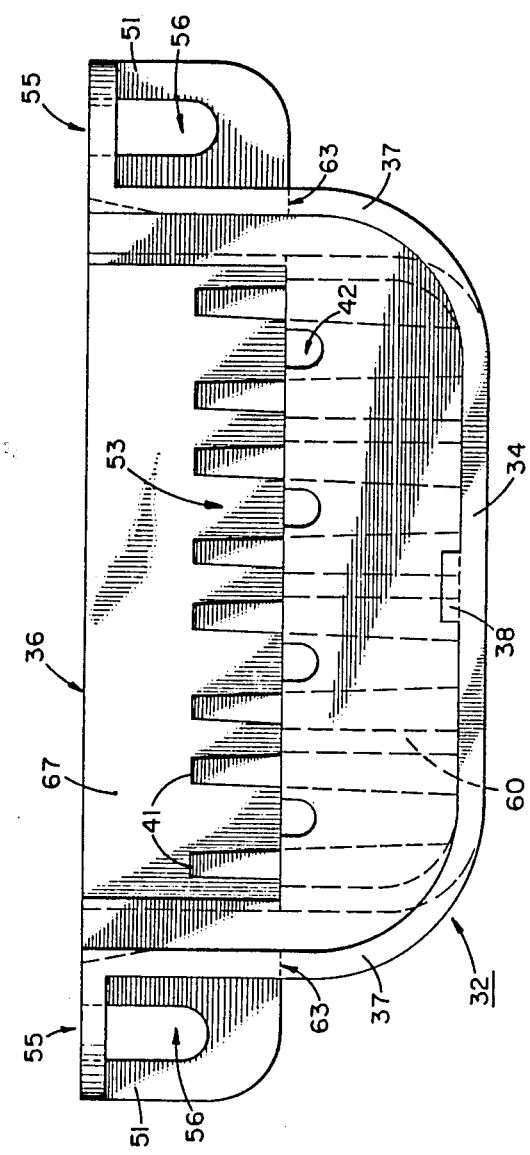

SOCKET FOR COMPACT FLUORESCENT LAMPS

BACKGROUND OF THE INVENTION

1. Field of the Invention

The present invention relates to electrical sockets and connectors in general, and more particularly to a female holder or socket for a compact fluorescent lamp having two or more compact fluorescent tubes which share a common base, wherein the socket provides electrical connections and gripping means for the lamp base.

2. Description of the Related Art

Compact, super compact, or "Mini-" fluorescent lamps, known by many commercial names, such as Philips "PL", are rapidly gaining in popularity because they often provide as much light as a similar size incandescent lamp while requiring less than one-third the power and achieving 10 times greater service life.

These compact fluorescent lamps require sockets of unique design, in order to provide advantages to the user which may include various mounting methods to a surface, and rapid, safe, and easy wiring. These advantages are important with this type of lamp because with all connections made at a single base rather than at opposite ends of the common fluorescent tube, compact fluorescent lamps are finding application in space-saving lighting fixtures, ergonometric desk lamps, prefabricated or modular carrels and work stations, and cabinets, explosion-proof globes, and other single-end-access fixtures formerly requiring incandescent lamps.

In order to provide a wide range of sockets in large quantity and at low cost to meet expected demand, need for improvement in socket design for efficient, low-cost manufacture has become apparent.

Presently, sockets for smaller, compact fluorescent lamps, say of the 7-, 9-, and 13-watt sizes, typically are configured as a housing enclosure, usually constructed of two or more molded plastic parts, having a back wall and four side walls, open at one end to accept a relatively large lamp base member of a generally rectangular solid shape, such base member enclosing the starter and perhaps other elements of the electrical circuit of the lamp. Usually, the bottom and two, and frequently four, of the sides of the base member are closely contacted along their length by the sides or other surfaces within the housing to provide a high degree of lateral support for the lamp after it has been inserted within the housing. Additionally, the housing includes at least one side with an inward facing hook, or flange, of metal or plastic for establishing reversible gripping engagement with a retaining hook on the base of the lamp when the lamp is inserted in the housing, thus providing axial resistance against removal of the lamp. The lamp has two or more terminal pins, which terminal pins engage terminals in the housing in a sliding fit as the lamp base member is inserted into the housing. It can be seen that, with the smaller lamps having relatively large base members and a housing providing relatively large, solid support surfaces, the lamp is relatively securely retained in the housing, can be mounted in any orientation, and substantially resists removal from the housing.

With compact fluorescent lamps of larger wattage, for example the Philips "PL" 18-watt lamp, the starter and ballast elements are not included in a base member and, consequently, the base member is considerably smaller than it would otherwise be with a lower wattage lamp and, therefore, there is less surface for support within a conventionally designed housing. Known sockets for such lamps do not provide sufficient resistance against lamp removal to permit their use in any orientation without the need for additional supporting members apart from the lamp socket itself. Additionally, known sockets for such lamps frequently employ metal parts for gripping or other uses, which parts, of course, are subject to corrosion and thus may shorten the life of the sockets. Also, with some known sockets, electrically active parts are fairly readily accessible for contact by foreign objects.

Prior attempts to provide lamp sockets having such sufficient resistance against lamp removal are, for example, described in U.S. Pat. Nos. 4,643,503, issued Feb. 17, 1987, and 4,637,671, issued Jan. 20, 1987, both to Johnson, et al.

Patent '503 describes a socket device for a compact fluorescent lamp, which lamp comprises two tubes joined at one end to form a U-shaped lamp. The lamp has a coupling member or base at the other end thereof. The lamp base includes two opposed cross walls and opposed, semi-cylindrical end walls which encircle the outside areas of the lamp tubes and join the cross walls. At one end of the cross walls is an inner wall which is transverse to the cross walls and which grips two pairs of male electrical connecting prongs which are electrically connected to the ends of the lamp tubes. An outer wall, parallel to the inner wall, is located at the opposite end of the cross walls. The socket device includes a body wall having opposed inner and outer surfaces, with the inner surface parallel to the inner wall of the lamp base. The body wall forms two pairs of female electrical receptacles aligned in a row lateral the upper and lower cross walls at the inner surface adapted to receive the connecting prongs when the lamp base is inserted in the socket device. The socket device includes a support member comprising a support wall extending perpendicularly from the body wall to a position spaced directly below the lower cross wall of the lamp base. The support member also includes a pair of spaced, parallel support members connected to the support wall and extending though the space between the lower cross wall and the support wall for bearing contact with the lower cross wall. The body wall also defines a pair of elongated mating slots at the upper portion thereof at a position slightly spaced upward from the plane of the upper cross wall and from the female receptacles. The socket device includes a wire locking member with a biasable pair of spaced, parallel connecting portions that extend through the mating slots and springingly bear against the outer edges of the slots and are in gripping contact with outer surface of the body wall. The wire locking member also includes a pair of spaced, generally parallel supporting wire portions that extend from the connecting portions across, and in pressing contact with the upper cross wall, and terminate by forming a cross-wire portion that extends downwardly between the two tubes and in pressing, clamping association with the outer wall of the lamp base. The lamp is thus held against downward or upward transverse movement or tilting by the cooperation of the wire locking member and the parallel support members. Transverse movement of the lamp is resisted by the cooperation of the wire locking member and the connecting prongs inserted in the female receptacles. The wire locking member also resists removal of the lamp in the direction along the axis of the lamp.

Patent '671 describes a socket device identical to the device of Patent '503, except that the wire locking member has been replaced by a screw. Here, the screw extends through a threaded hole in an upper wall of the socket device, the upper wall extending transversely from the top of the body wall and over the upper cross wall of the lamp base. The screw bears against, and slightly deforms, the upper cross wall, thus securing the lamp in place. A locking washer is placed between the head of the screw and the upper surface of the upper wall. The cooperation of the screw, the support members, and the inner wall of the lamp base bearing against the inner surface of the body wall resist movement of the lamp in any direction.

Both of the abovedescribed sockets have inherent disadvantages when compared to the socket of the present invention. Each requires more parts than the present invention and, therefore, requires more complicated manufacturing processes. Additionally, if the wire and screw members are formed of metal, possibilities of corrosion problems exist. Also with each, it may be somewhat difficult to remove the lamp when either socket is mounted in certain orientations.

Another prior lamp socket device is described in U.S. Pat. No. 4,713,019, titled "Sockets for Compact Fluorescent Lamps, issued Dec. 15, 1987 to Edwin Gaynor. There, the socket comprises a back wall connected to four side walls, open at one end to accept the rectangular base of the lamp with the surfaces of the base closely contacting the inner surfaces of the back and side walls for support against transverse movement of the lamp. Removal of the lamp in the direction of the axis of the lamp is resisted by at least one inward facing hook on a side wall, the hook being shaped for establishing reversible locking engagement with a retaining hook on the lamp base. At least two such inward facing resilient flange hooks are preferred. While such a device is quite satisfactory for mounting and supporting therein a lamp of the type having a relatively large base, it is not satisfactory for mounting lamps of the type to which the present invention is directed.

SUMMARY OF THE INVENTION

The lamp holder socket of the present invention provides for the mounting of larger compact fluorescent lamps with sufficient grasping force to resist lateral and axial displacement to permit the lamp to be mounted in any orientation without the need for additional support apart from the socket itself.

Briefly, according to the invention, there is provided a socket for larger compact fluorescent lamps having two or more parallel fluorescent tubes sharing a common base that has two or more terminal pins. The lamp base includes retaining ridges disposed on opposite sides thereof. The socket comprises a housing which includes a front wall and a back wall, with top, bottom, and two side walls extending from the back wall and forward of the front wall. A front opening defined by the extension of the four walls receives the lamp base. Either of the top or bottom walls forward of the front wall includes an integral nonresilient inward facing hook shaped for establishing engagement with one of the ridges on the lamp base. The opposite one of the top or bottom walls forward of the front wall includes an integral resilient flange having an inward facing hook shaped for establishing reversible gripping engagement with the other ridge on the base of the lamp when the lamp base is inserted into the housing.

Channels embracing metal terminals for receiving the lamp's terminal pins at one end and connecting wires at the other end are defined between the front and back walls and between intermediate walls extending between the front and the back walls. The channels are dimensioned to tightly hold the terminals against lateral displacement. The terminals are held against axial displacement by the front wall, by posts rising adjacent the intermediate walls, and by rearward facing wire-grip flanges on the terminals which bear against the back wall of the socket or against wires when wires are thrust between the wire-grip flanges and the back wall for electrical contact. The wire-grip flanges springingly engage the back wall so that the resulting V will accept a wire's entrance into it and through the vertex, but will resist its withdrawal. The front of each terminal includes a pin-receiving trough dimensioned to springingly grip a terminal pin on the lamp base, which trough is exposed through an oblong opening in the front wall of the socket, the major axis of the oblong opening intersecting the walls having the inward facing hooks, and the base of the troughs of the terminals being at the ends of the oblong openings closest the nonresilient hook.

Insertion of the lamp may be accomplished by simply thrusting the lamp directly and axially into the socket, with the terminal pins being forced into gripping engagement with the sides of the pin-receiving trough, and with the resilient and nonresilient hooks engaging the ridges on the lamp base. With the embodiment of the invention described, insertion of the lamp is more conveniently accomplished by placing the lamp at an acute angle from the side having the nonresilient hook, engaging the nonresilient hook with a ridge on the lamp base, and pivoting the lamp about the nonresilient hook and engaged base ridge, so that, as the lamp moves into full engagement with the socket, the terminal pins pivot together and enter the oblong openings at the ends opposite the bases of the troughs of the terminals and will thus slide down into gripping contact with the troughs, while the resilient hook will reversibly engage the other ridge on the lamp base. The combination of the resilient and nonresilient hooks on the walls of the socket engaging the ridges on the lamp base together with the gripping action of the terminals which are tightly held within the socket provides means for securing the lamp to such degree that it can be mounted in any orientation without the need for additional support apart from the socket itself.

In one embodiment, the socket includes a pair of openings to accept snap-in-lock flanges for holding the socket adjacent to a mounting surface.

In another embodiment, the socket includes flanges for mounting to surfaces in back of or above the socket.

Accordingly, a principal object of the invention is to provide a socket for higher-wattage compact fluorescent lamps, which will support such a lamp in any orientation without the need for additional support apart from the socket itself.

Another object is to provide such a socket that is easy to manufacture and which has no metal parts other than those necessary for electrical connections.

A further object of the invention is to provide such a socket which lends itself to easy and quick acceptance of mounting style changeover in manufacture, by utilizing various molding dies producing different shapes and orientations of mounting flanges.

Yet another object of the invention is to provide such a socket which, when the lamp is inserted, completely encloses all electrically active components, without easy access thereto, to prevent accidental contact by wires, knife blades, or other foreign objects.

Other objects of the invention will in part be obvious and will in part appear hereinafter.

The invention accordingly comprises the features of construction, combinations of elements, and arrangements of parts which will be exemplified in the constructions hereinafter set forth, and the scope of the invention will be indicated in the claims.

For a fuller understanding of the nature of and objects of the invention, reference should be had to the following detailed description taken in connection with the accompanying drawings, in which:

BRIEF DESCRIPTION OF THE DRAWINGS

FIGS. 12 and 13 are top plan views and FIGS. 14 and 15 are front elevation views, respectively, of the lower body part of the embodiments of FIGS. 2 and 3.

DETAILED DESCRIPTION OF THE PREFERRED EMBODIMENTS

Figure 1:
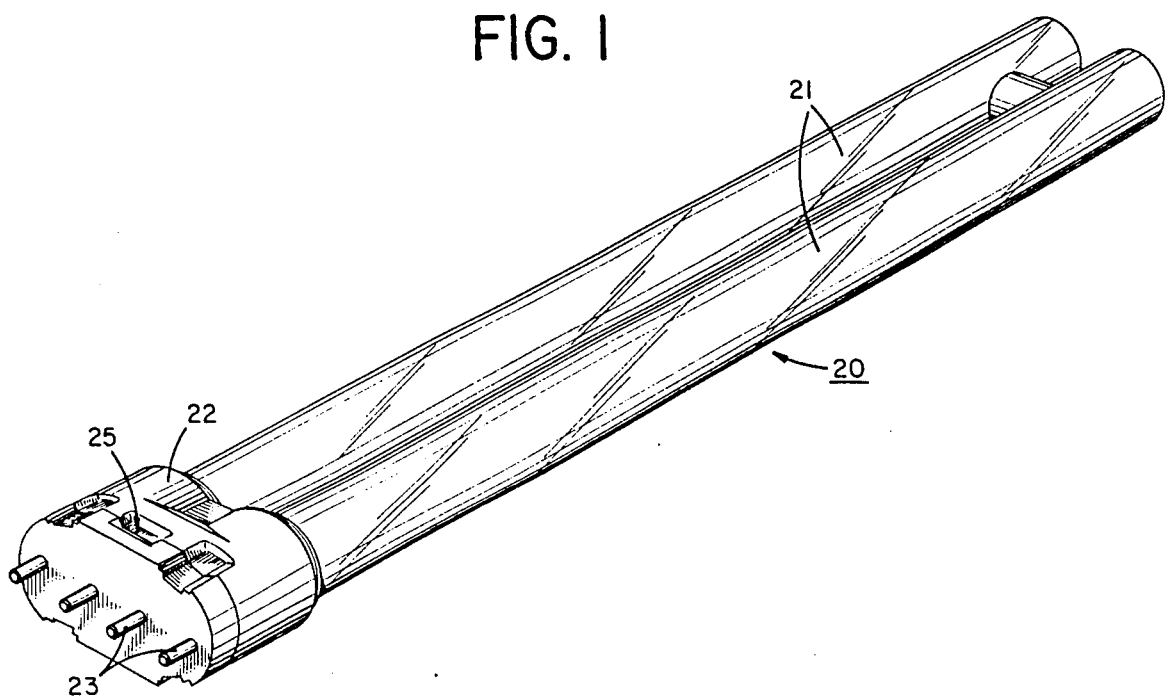
FIG. 1 is a perspective view of an 18-watt, twin-tube compact lamp.

Referring now to the drawings, FIG. 1 shows a compact fluorescent lamp, generally indicated by the reference numeral 20, such as the Philips "PL18W/82", which is engageable in the socket of the invention, generally indicated by the reference numeral 30, shown on FIGS. 2, 3, 4, and 19. Lamp 20 includes two parallel tubes 21 which are connected to each other so that operating in series, they provide the illumination of a tube equal to the sum of their lengths. Tubes 21 terminate in a common lamp base 22 which includes male terminal pins 23. Lamp base 22 also includes a pair of ridges 24 for holding the lamp base in an appropriately designed socket. Ridges 24 are defined by recesses 25, so as to maintain the surfaces of the ridges flush with lamp base 22.

Socket 30 includes upper and lower body parts, generally indicated by the reference numerals 31 and 32, respectively, shown in assembled relation in FIGS. 2, 3, 4, and 19. Upper and lower body parts 31 and 32 are secured together by resilient latch flanges 61 described more fully with reference to FIGS. 6 through 15, below. Upper body part 31 forms top wall 33 and lower body part 32 forms bottom wall 34 of socket 30. Together, upper and lower body parts 31 and 32 form front wall 35 of socket 30. Lower body part 32 also forms back wall 54 and side walls 37. It is seen that walls 33, 34, and 37 extend forward of front wall 35, thereby defining an opening for receiving lamp 20. Located at the forward edge of bottom wall 34 is a nonresilient inward facing hook 38, and opposite hook 38 at the forward edge of top wall 33 is a resilient inward facing hook 39, with hooks 38 and 39 engaging ridges 24 of lamp 20 when lamp 20 is inserted in socket 30.

Located in socket 30 are electrically conductive terminals 40 which are firmly secured against axial motion along terminal pins 23 by front wall 35, back wall 54, and posts 41. Oblong openings 42 in front wall 35 provide access to electrically conductive terminals 40 and circular channels 43 include an insulation-accepting body part 44 which accommodates a buffer of wire insulation 45 between the stripped end of wire 46 that is locked into electrical contact with terminal 40 by wire-grip flange 47 of the terminal and the inner surface of back wall 54 of socket 30.

Figure 2:
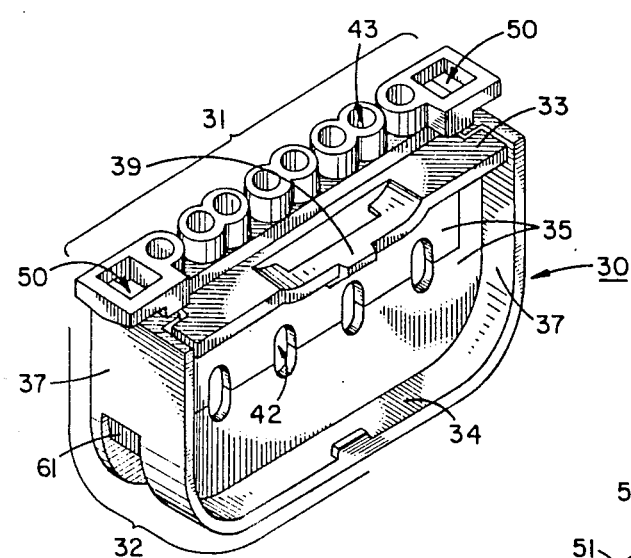
FIG. 2 is a perspective view of one embodiment of the present invention.

Socket 30 shown in FIG. 2 includes a pair of square openings 50 in upper body part 31 to accommodate snap-in-lock flanges (not shown) for mounting the socket. Socket 30 shown in FIG. 3 includes a pair of mounting flanges 51 in lower body part 32 for attachment with fasteners to a surface above or behind the socket, the mounting flanges having defined therein holes 55 for locating socket 30 on an overlying surface, and also having defined therein elongated holes 56 for fastening the flanges to a rear mounting surface.

Figure 5:
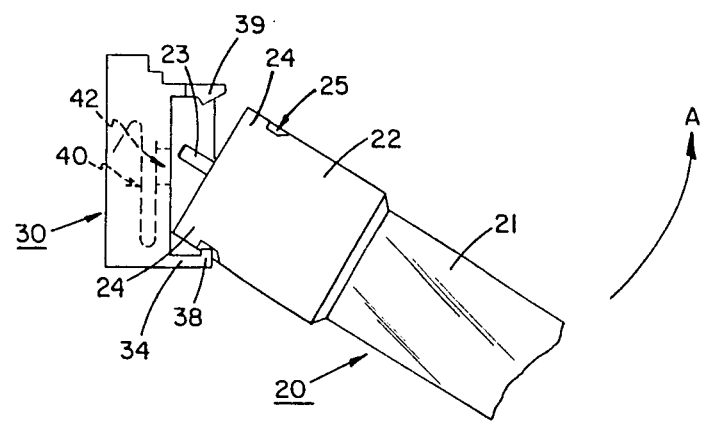
FIG. 5 is a corresponding schematic representation showing the method of insertion of a lamp base into the socket.

FIG. 5 shows the method of insertion of lamp 20 into socket 30. Lamp 20 is held at an acute angle to the plane of bottom wall 34 of socket 30, with the lower one of ridges 24 engaging nonresilient hook 38. Lamp 20 is then pivoted about engaged ridge 24 and nonresilient hook 38 in the counterclockwise direction "A", as indicated by the arrow. As lamp 20 is being pivoted into position to fully engage socket 30, terminal pins 23 enter the tops of oblong openings 42 to engage terminals 40, and resilient hook 39 establishes gripping engagement with the upper one of ridges 24.

Figure 3:
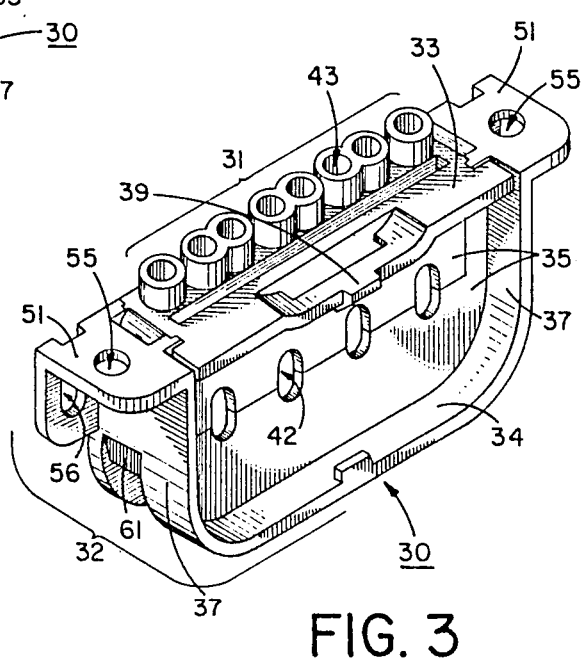
FIG. 3 is a perspective view of another embodiment of the present invention.
Figure 4:
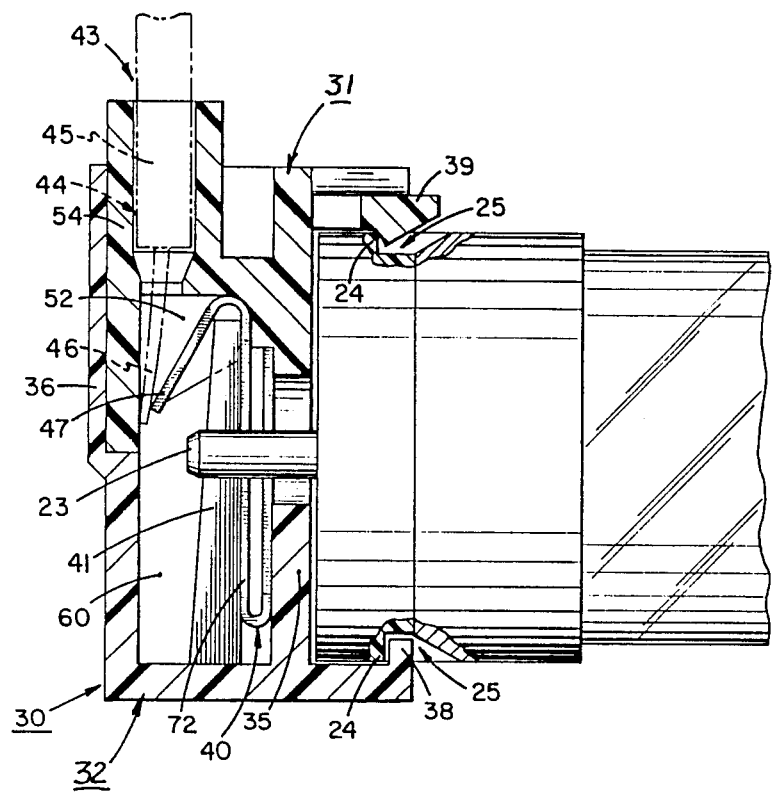
FIG. 4 is an enlarged cross-sectional side elevation view showing a lamp base inserted into the socket of the present invention.
Figure 6:
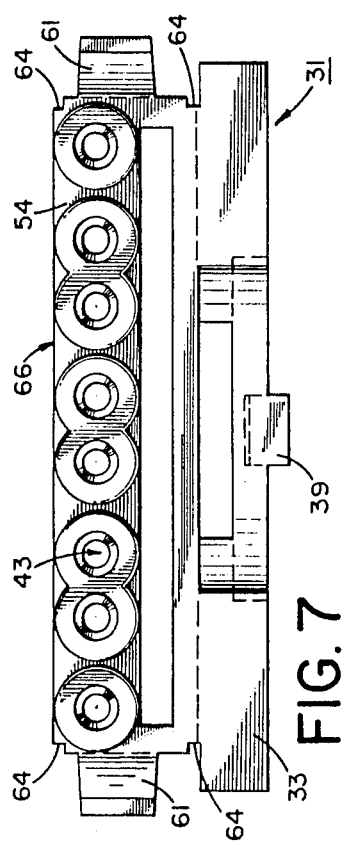
FIGS. 6 and 7 are top plan views.
Figure 8:
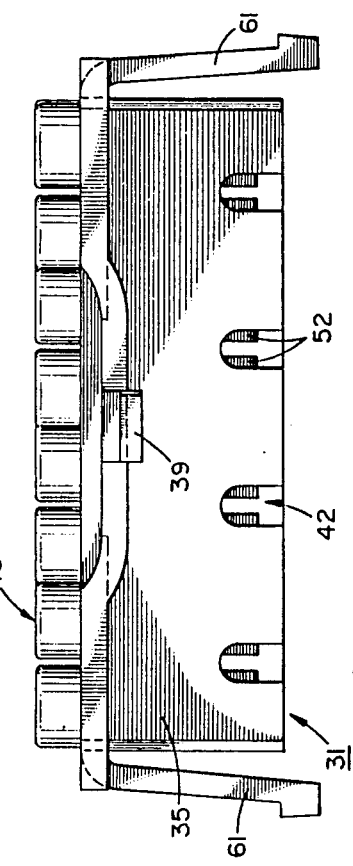
FIGS. 8 and 9 are front elevation views.
Figure 10:
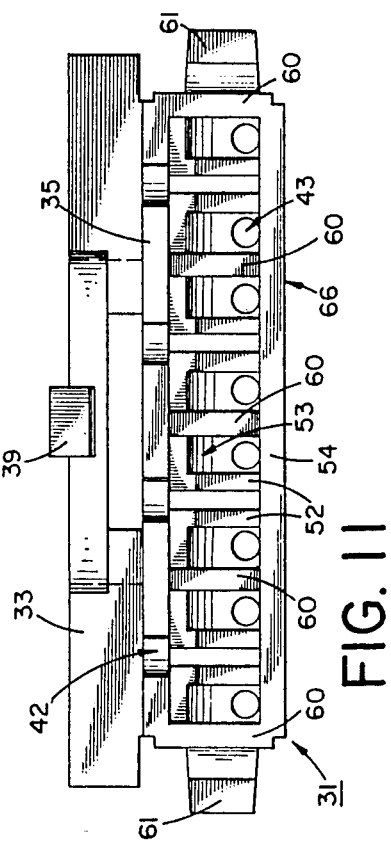
FIGS. 10 and 11 are bottom plan views, respectively, of the upper body parts of the embodiments of FIGS. 2 and 3.
Figure 7:
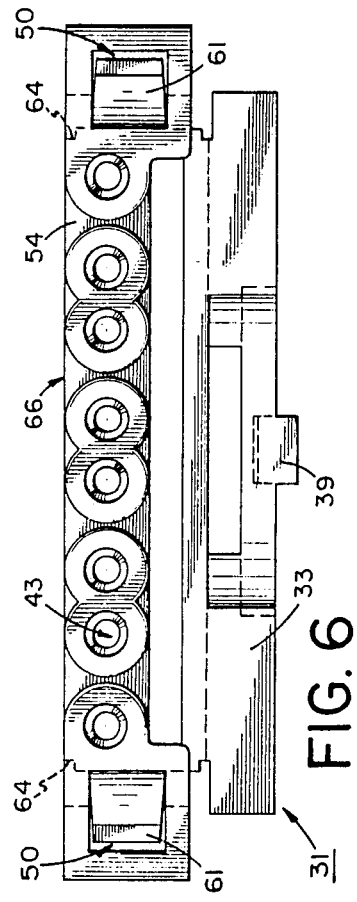
Figure 9:
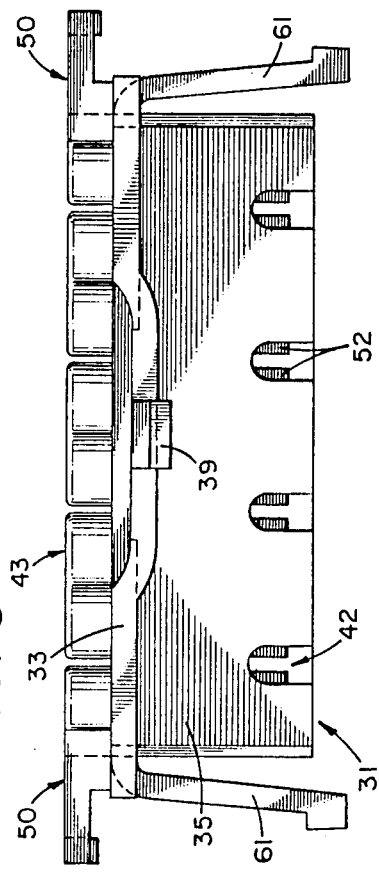
Figure 11:
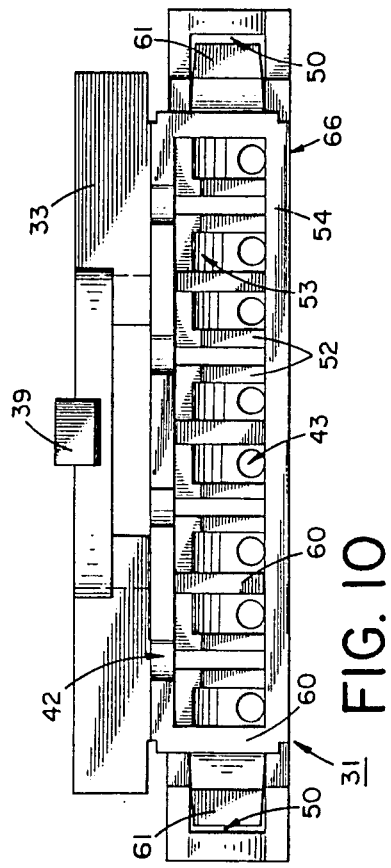
Figure 12:
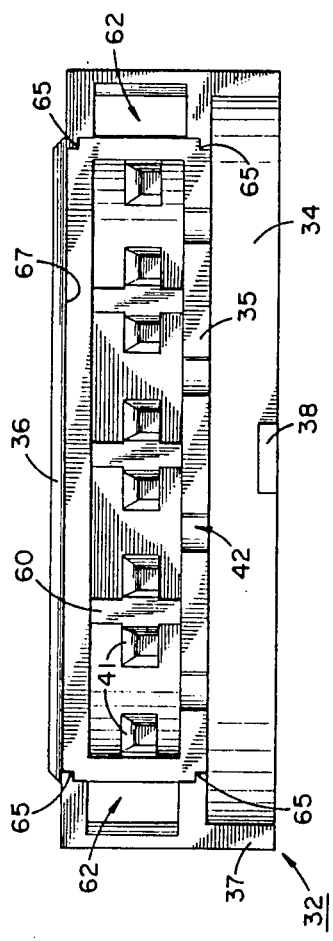
Figure 14:
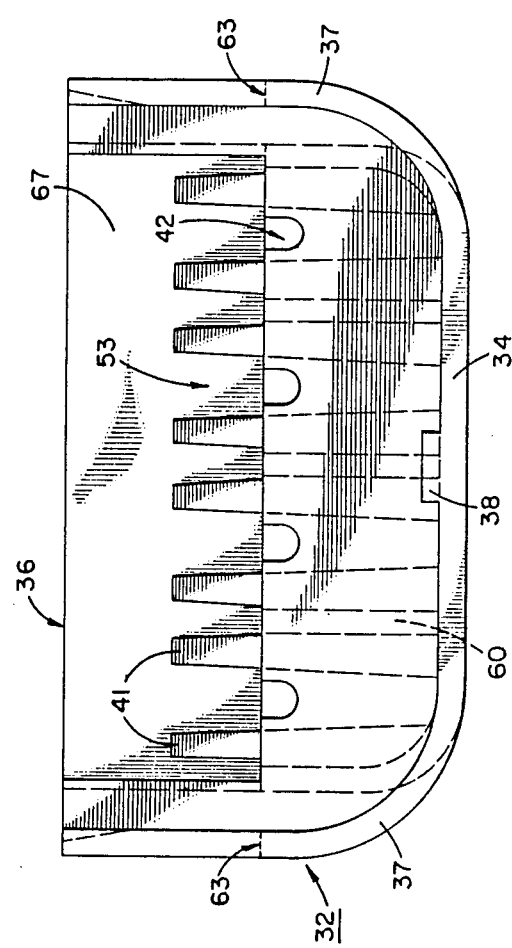

FIGS. 6 and 7 are top plan views, FIGS. 8 and 9 are front elevations, and FIGS. 10 and 11 are bottom plan views, respectively, of upper body part 31 of the embodiments of the invention shown in FIGS. 2 and 3. Similarly, FIGS. 12 and 13 are top plan views and FIGS. 14 and 15 are front elevations, respectively, of lower body part 32 of the embodiments of the invention shown in FIGS. 2 and 3. Reference numerals for the elements shown in FIGS. 6 through 15 are as shown for like elements in FIGS. 2 and 3. Also shown in FIGS. 10 and 11 are double intermediate walls 52 centered between intermediate walls 60, which together with intermediate walls 60 and front wall 35, top wall 33, and back wall 54 of upper body part 31 define channels 53 into which, with reference to FIGS. 16, 17 and 18, the wire-grip flange 47 and the upper part of vertical member 72 of terminal 40 are compressively inserted.

Particular note should be made of posts 41 and intermediate walls 60 in FIGS. 12 through 15, as these elements, together with front wall 35 and back wall 36 are instrumental in firmly holding terminals 40 in position. Attachment of upper body part 31 to lower body part 32 is accomplished by sliding resilient latch flanges 61 through openings 62 and allowing the ends of the latch flanges to engage surfaces 63 of side walls 37. Upper body part 31 is further guided into and held in lower body part 32 by the engagement of stepped corners 64 with corresponding stepped corners 65 of lower body part 32 and by the engagement of rear surface 66 of back wall 54 with inside surface 67 of back wall 36, which spans the upper rear portion of lower body part 32 and overlaps back wall 54 after attachment of body parts 31 and 32.

Figure 18:
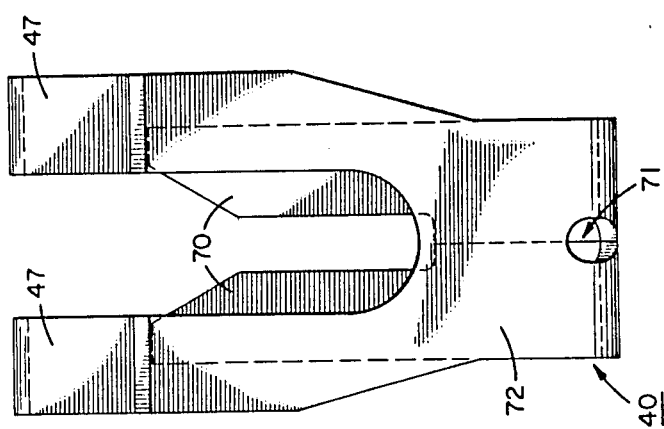
FIGS. 16, 17, and 18 are respective front, side, and rear elevation views of an electrical terminal incorporated in the socket of the present invention.
Figure 17:
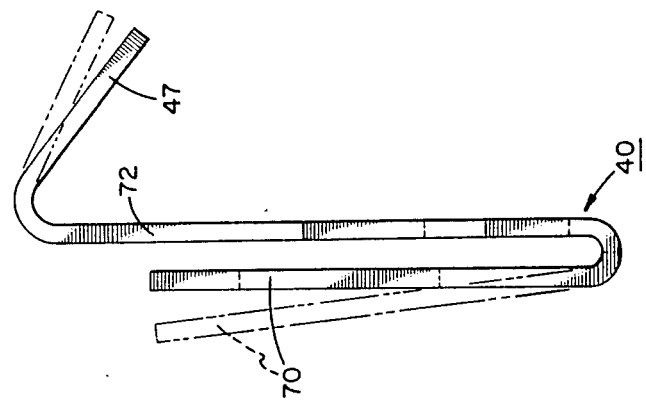
Figure 16:
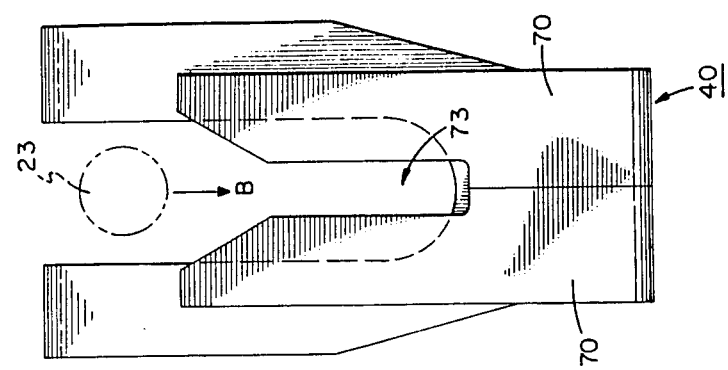

FIGS. 16, 17, and 18 show a Z-shaped conductive terminal 40 having paired front flanges 70 which define a pin-receiving trough 73 into which a terminal pin 23 may be inserted. Flanges 70 are spaced such that terminal pin 23 spreads them springingly apart upon insertion in the direction "B", indicated by the arrow in FIG. 16, so that the terminal pin is firmly gripped by the flanges. An opening 71 defined in the lower part of terminal 40, and terminating the slot separating flanges 70, aids the spring-gripping action. Flanges 70 also have a spring relation with Y-shaped vertical member 72, being joined thereto at their U-shaped lower ends. Flanges 70 are shown in dashed lines in their normal position and in solid lines when in the flexed position when inserted into socket 30, flanges 70 and member 72 being forced toward each other between front wall 35 and posts 41. Similarly, wire-grip flanges 47, extending diagonally downward and rearward from the upper ends of Y-shaped vertical member 72, are shown in dashed lines in their normal position and in solid lines when in their flexed position when inserted into socket 30, wire-grip flanges 47 and vertical member 72 being forced toward each other between front wall 35 and back wall 54. The relative positions of the dashed and solid positions indicate the extent to which terminal 40 is grippingly held in socket 30. While only one of wire-grip flanges 47 is necessary for electrical connection of a stripped-end conductor to terminal pin 23, a second wire-grip flange is provided for convenient connection by a second stripped-end conductor to another device.

Figure 19:
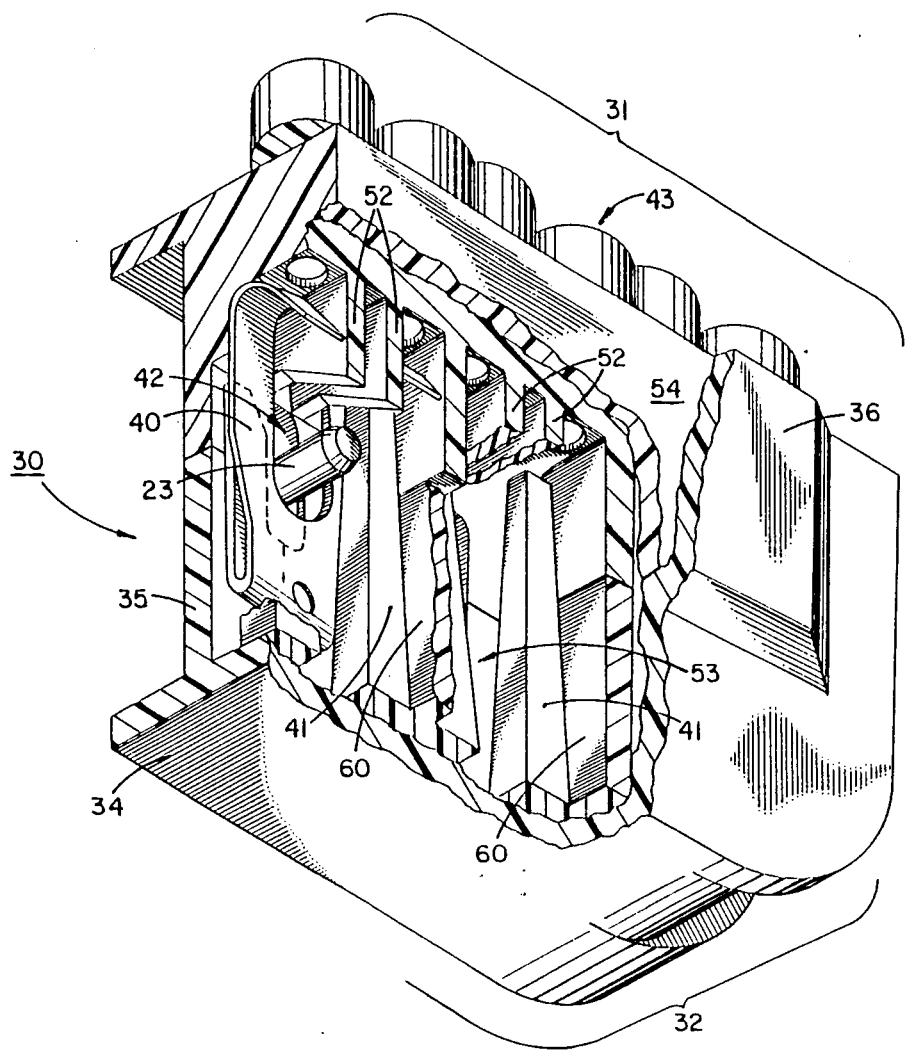
FIG. 19 is a partial cutaway perspective view of a socket constructed according to the present invention.

FIG. 19 is a partial cutaway perspective view of socket 30 showing the elements described above, in assembled relationship and showing particularly how the internal elements of the socket cooperate to hold electrically conductive terminals 40 securely in place. Paired front flanges 70 and vertical member 72 of terminal 40 are compressed toward each other and grippingly held between front wall 35 and posts 41. The portion of terminal 40 joining wire-grip flanges 47 and vertical member 72 are gripped between the top of posts 41 and the lower surface of upper body part 31. The outside edges of vertical member 72 are closely held by intermediate walls 60. Wire-grip flanges 47 are also securely held, with the outside edges of the wire-grip flanges held in contact with intermediate walls 60 and the insides of the wire-grip flanges held in contact with double intermediate walls 52. Thus wire-grip flanges 47 are virtually locked in position inside socket 30 and are a key feature in holding lamp 20 in position without the need for additional locking elements.

FIG. 19 also clearly shows how the interior of socket 30 is protectively isolated from the outside and, once lamp 20 is inserted in the socket, there are no openings or easily removed access means which would allow contact with foreign objects.

Assembly of socket 30 is easily accomplished by first inserting terminals 40 into channels 53 in upper body part 31 where they are grippingly held therein by the compression of wire-grip flanges against back wall 54. Then resilient latch flanges 61 on upper body part 31 are flexed inwards toward side walls 37 of upper body part 31 and the upper body part is inserted into lower body part 32 while the resilient latch flanges are guided into openings 62 and, then as the body parts come into full engagement, the resilient latch flanges spring outward and engage surfaces 63. The resulting assembly can be separated only with some difficulty and not accidentally. The latter feature together with the totally enclosed and inaccessible interior of socket 30 provides a device that is extremely safe.

To complete installation of the socket, a section of wire insulation 45 is removed to expose stripped end of wire 46 which is then inserted into circular channel 43 and thrust into the vertex formed between wire-grip flanges 47 and back wall 36. The latter step causes the wire to be held firmly, thus preventing unintentional withdrawal.

With the embodiment of the invention described, insertion of lamp 20 is conveniently accomplished by placing the lamp at an acute angle with bottom wall 34, with ridge 24 on lamp base 22 in engagement with nonresilient hook 38. Lamp 20 is then pivoted about nonresilient hook 38 so that, as the lamp moves into full engagement with socket 30, terminal pins 23 pivot together and enter oblong openings 42 and into the top of pin-receiving troughs 73 and slide down into gripping contact with the troughs, while resilient hook 39 reversibly engages the other ridge 24 on lamp base 22. The combination of nonresilient and resilient hooks, 38 and 39, respectively, engaging the ridges on lamp base 20 together with the gripping action of the terminals which are tightly held within the socket provides means for securing the lamp to such degree that it can be mounted in any orientation without the need for additional support apart from the socket itself.

It can be seen that socket 30 is simply constructed, the upper and lower body parts being conveniently formed of plastic by an injection molding process. The only metal parts employed are the electrically conductive terminals 40 which are inserted into upper body part 31 before it is inserted into lower body part 32. All electrically active parts are totally enclosed in the socket when the lamp is inserted and are protected against accidental contact and cannot be easily accessed.

While the invention has been described as applied to a compact fluorescent lamp having a particular configuration of two tubes and a base having four terminal pins lying in the same plane, as shown in FIG. 1, it will be understood that it could be applied as well by one skilled in the art to receive compact fluorescent lamps having other numbers of tubes or other numbers of terminal pins whether or not lying in the same plane.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A socket for a compact fluorescent lamp which includes two or more parallel tubes that share a common base, said base including at least two terminal pins and two retaining means for engagement with the socket, comprising:
- a housing including a back wall, a front wall, with top and bottom walls and two side walls extending from said back wall and forward of said front wall each terminating in a forward edge, thereby defining a front opening for receiving said lamp base,
- channel means formed in said housing enclosing conductive terminal means for receiving each of said terminal pins in electrically conductive engagement,
- said front wall defining openings through which said terminal pins project for engagement with said conductive terminal means,
- an inward facing rigid nonresilient latch fulcrum ledge formed on the forward edge of one of said top and bottom walls for engagement with a first one of said retaining means of said lamp base,
- and an inward facing resilient latch formed on the forward edge of the other of said top and bottom walls whereby engagement of said first one of said lamp base retaining means for pivoting movement about said rigid nonresilient latch fulcrum ledge, followed by angular pivoting movement of the lamp, advances the terminal pins angularly into the channel means until the second socket base retaining means latches with said resilient latch, thereby establishing reversible locking engagement of said socket with said retaining means of said lamp base.

2. The socket defined in claim 1, further comprising a pair of flanges joined to said side walls for mounting said socket to a mounting surface.

3. The socket defined in claim 1, wherein said channel means for enclosing said conductive terminal means includes:
- inside surfaces of said back and front walls,
- a first set of intermediate walls extending from said front to said back walls and from said bottom to said top walls,
- posts rising from said bottom wall and attached to said first set of intermediate walls,
- said conductive terminal means being located within said channels for electrically connecting with said pins projecting through said openings in said front wall of said socket,
- and said conductive terminal means being adapted for receiving in electrically conductive engagement a bared wire introduced through said top wall of said socket.

4. The socket defined in claim 3, further comprising a second set of intermediate walls depending between said front, top, and back walls in said channel means, engaging and stabilizing the conductive terminal means.

5. The socket defined in claim 4, wherein said conductive terminal means each includes:
- a vertical member having an upper top end and a lower base end,
- laterally spaced flanges which define a pin-receiving rough into which one said terminal pin grippingly slides when said lamp base is inserted into said socket, which flanges are upward extensions of the base end of said vertical member and form a U-shape with said vertical member, which itself forms the bottom of said trough,
- a wire-grip flange which is an extension of the top end of said vertical member and which forms a concave V-shape with said vertical member,
- and when said conductive terminal means are in assembled relation with said socket, the bottom of said trough is oriented toward the wall with the nonresilient latch fulcrum ledge.

6. The socket defined in claim 5, wherein, in combination, the grasping force of said inward facing resilient latch in engagement with said retaining means of said base and the grasping force of said terminal pins in engagement with said conductive terminals are sufficient to allow said socket with said lamp to be mounted in any orientation without additional support apart from said socket itself, and to resist removal of said lamp from said socket.

7. The socket defined in claim 5, wherein when said conductive terminal means are installed in assembled relation with said socket, said flanges and said vertical member are compressed toward each other by said front wall and said posts, and said wire-grip flange and said vertical member are compressed toward each other by said front and back walls so as to form a V-shaped upward opening wire-engaging trough between said wire-grip flange and said back wall, said trough having a vertex at its lower end where the flange converges with the back wall, and when a wire is advanced convergingly into said wire-engaging trough and resiliently deflecting and spreading the vertex formed by said wire-grip flange and said back wall, the withdrawal of said wire therefrom will be resisted.

8. The socket defined in claim 7, wherein the sides of said conductive terminal means are supported against lateral movement by said first and second sets of intermediate walls.

9. The socket defined in claim 3, wherein wire access openings are defined in said top wall, each said access opening including an intermediate constricted portion apertured to receive a bared wire end inserted therethrough, and each said access opening including a wire insertion portal extending from said top wall to the constricted portion and dimensioned to receive an insulation-covered wire adjacent to a bared wire end inserted through said apertured constricted portion of said access opening.

10. The socket defined in claim 1, further comprising a pair of openings formed in protrusions from said side walls for mounting to a mounting surface having snap-in-lock flanges.

11. The socket defined in claim 10, further comprising means defining a hole in each said flange for locating and an elongated hole for fastening the flange to the mounting surface.

12. The socket defined in claim 9, wherein said front, top, bottom, back and side walls define an enclosure blocking access to electrically active parts enclosed therein except by said lamp and said wires; whereby, when said lamp is inserted in said socket and said wires are inserted in said wire access openings, all said electrically active parts are inaccessible and are isolated from accidental contact with objects external to said socket.

13. The socket defined in claim 12, wherein said housing is formed of two mating molded plastic parts respectively provided with integral resiliently depressible lock flanges locking said two housing parts matingly together, whereby, when said lamp is inserted in said socket and said wires are inserted in said wire access openings, all said electrically active parts are inaccessible and are isolated from accidental contact with objects external to said socket.

14. The socket defined in claim 13 wherein said two molded plastic housing parts interfit telescopingly in overlapping relationship, blocking external access to electrically active parts inside said housing.

* * * * *